United States Patent [19]

Nath

[11] Patent Number: 5,584,558
[45] Date of Patent: Dec. 17, 1996

[54] LIGHT DEVICE HAVING FIRST AND SECOND OPTICAL SYSTEMS ARRANGED SUBSTANTIALLY 90° APART

[76] Inventor: Gunther Nath, Otto-Heilmann-Strasse 3, D-83031 Grunwald, Germany

[21] Appl. No.: 482,088

[22] Filed: Jun. 7, 1995

[30] Foreign Application Priority Data

Jul. 11, 1994 [DE] Germany .................. 44 24 344.8

[51] Int. Cl.$^6$ ..................................... F21V 7/04
[52] U.S. Cl. .............. 362/32; 362/26; 362/294; 362/328
[58] Field of Search ................ 362/32, 26, 31, 362/294, 328; 385/33

[56] References Cited

U.S. PATENT DOCUMENTS

| | | | |
|---|---|---|---|
| 5,099,399 | 3/1992 | Miller et al. | 362/32 |
| 5,143,435 | 9/1992 | Kikuchi | 362/32 |
| 5,207,494 | 5/1993 | Jones | 362/32 |
| 5,436,805 | 7/1995 | Hsu et al. | 362/32 |
| 5,452,395 | 9/1995 | Schichman et al. | 362/32 |

FOREIGN PATENT DOCUMENTS 94 00 445.5  4/1994  Germany .

Primary Examiner—Denise Gromada
Assistant Examiner—Alfred Basichas
Attorney, Agent, or Firm—Helfgott & Karas, P.C.

[57] ABSTRACT

A lighting device with two light pipes contains a light source with two optical systems arranged at right angles to each other and a common lamp. Behind the lamp, shifted by 9°, there are two reflector concave mirrors and, opposite each of them a condenser, which focuses the light arriving directly from the lamp and the light arriving from the reflector into one light pipe each. The full utilization of the light-pipe aperture requires a crowded construction, which is achieved by chamfered lateral edges of the condenser-lens mountings and the concave-mirror mountings, including cut-off lateral segments of the concave mirrors. Mirrors and lamp are contained in a replaceable module which module is inserted and fastened in the device housing, whereby the alignment of lamp and mirrors with the condensers (which are rigidly mounted in the housing) is automatically ensured. To both optical systems is assigned one light pipe each, which are operated simultaneously with a single lamp, whereby part of the irradiated energy of the lamp, which otherwise would have been uselessly radiated off is put to use, so that the output available through the light pipes is substantially doubled.

18 Claims, 1 Drawing Sheet

LIGHT DEVICE HAVING FIRST AND SECOND OPTICAL SYSTEMS ARRANGED SUBSTANTIALLY 90° APART

The invention relates to a lighting device which may be used for light irradiating purposes. More particularly, the present invention relates to a lighting device using a single lamp and a plurality of reflecting surfaces and light pipes for substantially increasing the available light output of the lamp.

BACKGROUND OF THE INVENTION

From DE-GM 94 00 445.5, a lighting device is known with an optical system consisting of a lamp, a reflector arranged on one side of the lamp, and a condenser arranged on the other side of the lamp. A support is provided for a light pipe aligning the lamp's input end with the condenser. In practice, there is often a need for carrying out simultaneous irradiations with two light pipes in order to avoid shadows or to apply a greater light intensity to an object. This is required, for example, in order to shorten the hardening time of UV-hardened adhesives in an industrial adhesive-bonding process.

When fiber-optic light pipes are used, the fiber bundle can be split, after the light-input end where all fibers are still joined, into two or more partial bundles. A corresponding fraction of the entire irradiated light energy may be transmitted via such bundles. In the case of liquid light-pipes, however, such splitting cannot be carried out in the same manner. Instead, two separate correspondingly thinner hoses must be coupled to one common light connection, in which connection these hoses are also separately terminated. The two round hose cross-sections, however, can only each have one-half the diameter of the undivided light pipes so that part of the light output supplied by the condenser does not reach the light pipe. Consequently, with the present state of the art, the coupling of several liquid light-pipes to a single light source does not allow the full utilization of the amount of light produced by the lamp in the condenser's focal spot. Therefore, whenever a greater output of light was needed, individually separate lamps and/or light sources had to be used.

SUMMARY OF THE INVENTION

One of the features of the present invention is the creation of a lighting device with two light pipes, using a single lamp and having a total available light-pipe output which is substantially double that of the light-pipe output of a single light-pipe having the same light-active cross-section, the same length and an optimum coupling to the lamp. This is particularly true when the light pipes are liquid light pipes.

By means of the arrangement according to the principles of the present invention, two optical systems are located at roughly right angles to each other. A lamp has a light-emitting center located at the intersection of the optical axes of the two optical systems. The light energy irradiated by the lamp in an overall spatial angle can be utilized in a significantly better manner than in the prior art and may be used for coupling in a second light pipe.

In prior art arrangements, the major part of the unused irradiation emitted by the lamp impacts the walls of the blackened lamp housing and is transformed in an undesirable manner into heat, the dissipation of which heat requires an appropriately dimensioned ventilator. By means of a further feature of the present invention, a second optical system is provided to utilize part of this normally lost radiation which is coupled as light energy into a second light pipe, without significantly diminishing the light output coupled into the first light pipe. In this manner, the available light-output may be substantially doubled.

In order to utilize the full aperture-angle and the full light-active cross section of the two light pipes, that is, in order to couple a maximum amount of light into each of the two light pipes preselected dimensions of the mirror and the condenser are necessary. These dimensions complicate the mounting of the necessarily duplicate optical elements around the lamp. Consequently, in accordance with a preferred embodiment of the invention, the abutting circular borders of the lens mountings of the condensers and of the mirror supports plus the mirrors are angularly beveled at right angles to the plane of the two optical axes so that the optically effective surfaces of these components substantially abut. Since such angular beveling only affects the parts of the reflector mirror which laterally adjoin the condenser and the adjacent mirror, the full diameters of the mirrors are utilized in a transverse direction. Consequently, the size of the reflective surfaces are significantly increased compared to a mirror having a diameter, which is normally reduced by the amount of beveling. In other words, more light is irradiated into the light pipe by utilizing the features of the present invention.

In a further embodiment of the present invention, the single lamp may be mounted with the two mirrors in a replaceable module, which module can be replaced in its entirety if the lamp must be exchanged. The reflector mirrors and the lamp are already mounted in an adjusted position, so that all the user has to do is to replace this module, without having to carry out any adjustments. During this operation the condensers remain rigidly attached in the device.

The preferred lamps are those with almost point-shaped sources of radiation, such as mercury or xenon high-pressure or maximum-pressure lamps. These lamps feature a tube-shaped bulb with a spherical shaped widening volume. In this volume, two rod electrodes fused into the tube-ends, terminate a small distance from each other. A plasma arc is established between the electrodes when the lamp is operated. In contrast to the lamps with an integrated ellipsoid reflector, as largely used in the past, these lamps are more economical and are freely accessible from all sides at right angles to the lengthwise axis of their bulb. In this fashion, the positioning of the plasma center at the crossing point of the axes of the two optical systems can be carried out without difficulty. Furthermore, the adjustment with respect to the two reflector mirrors and the two condensers is easily carried out via appropriate settings in the three coordinate directions (x, y, z), by means of a support on the tube end. These adjustments within the module are carried out at the factory, so that even in the case of a replacement of the module by the user, the precise adjustment of the optical system within the device remains ensured. Normally, the reflector mirrors are metallized by vacuum deposition (aluminum) spherical mirrors but they may also be dichroic spherical mirrors. The latter are transparent to long-wave radiation so that as little heat radiation as possible is irradiated into the light pipe. Since, in the majority of applications of liquid light-pipes, UV radiation is needed, the lenses of the condensers are advantageously made out of UV-transparent quartz glass.

It is advantageous to use as light pipes, liquid-filled light pipes, which contain a hose made of a fluorocarbon polymer with a thin internal coating of an amorphous fluorinated synthetic material, as well as a liquid fill, which may be, for example, an inorganic aqueous salt solution. Above-mentioned fluorinated synthetic material has the formula

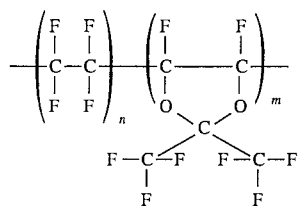

and is based on a combination of tetrafluorethylene and a fluorinated cyclic ether, which functions as a distancing component with respect to the polymer main chain. In this manner, crystallization is sterically prevented. Such light pipes have an aperture angle of 72° and a light-active diameter of preferably 5 mm. They may be optically coupled to the light source by means of plug-in sockets, so that they can be easily pulled out between operating periods.

In a preferred embodiment of the device according to the invention, the plug-in sockets for the two light pipes are at right angles to each other behind one of the device walls and are accessible through openings for the plugging-in of the light pipes. Preferably there are arranged, between the sockets and the respective condenser, one electrically controlled lock each, by means of which the opening times of the locks pertaining to the two light pipes are advantageously adjustable, independently of each other. In this fashion, the two light pipes may be used independently of each other for separate irradiation procedures, as an example, in a manufacturing process, in which bondings are to be hardened by means of UV irradiation.

Instead of two separate devices, by utilizing the present invention only one device is required having two light pipes which may be used, for example, on adjacent manufacturing lines. If double light pipes of the type mentioned at the outset are used, it may even be possible to achieve four light pipe outputs with a single light source. If only short time periods are available for the irradiation of a workpiece—for example, because of the short cycle times of a manufacturing line—the device according to the present invention, with two light pipes allows the irradiation of the workpiece with the double light output (without increasing the lamp output), compared to the optimum arrangement with a single light pipe of the same dimensions. In this fashion, for example, the hardening time of an adhesive may be appropriately shortened.

The above-mentioned liquid light pipes have a relatively large aperture angle (72°). For a full utilization of that angle, an aperture angle of the condenser must be selected that is greater than 60°, so that the pertinent concave mirror has a diameter of 35 mm and the condenser has a suitably large diameter of about 30 mm. However, since the latter is not independent of the radius of curvature of the concave mirror—in whose center the center of the light plasma of the lamp should be located—opposing requirements between the size and arrangement of these optical elements result. According to the present invention, this problem is solved by the above-mentioned bevelings, which only affect lateral sections of the mirrors and of the condenser mountings and otherwise allow as large as possible an aperture of the optical concentrating elements in spite of the crowded construction. As a result, substantially double the light-output of the lamp may be coupled into the two light pipes. Specifically, more than 190% of the light output is provided compared to what is possible with a single light pipe. The thus achieved substantial doubling of the irradiation output on the workpiece allows an appropriate shortening of the processing time. Consequently, within the useful life of a commonly used lamp (which is about 800 hours), a greater number of workpieces may be processed and consequently the useful-life performance of the lamp may be significantly raised.

BRIEF DESCRIPTION OF THE DRAWINGS

The invention is explained in detail, by means of the attached drawings of a preferred embodiment in which.

DETAILED DESCRIPTION OF THE INVENTION

Figure 1:
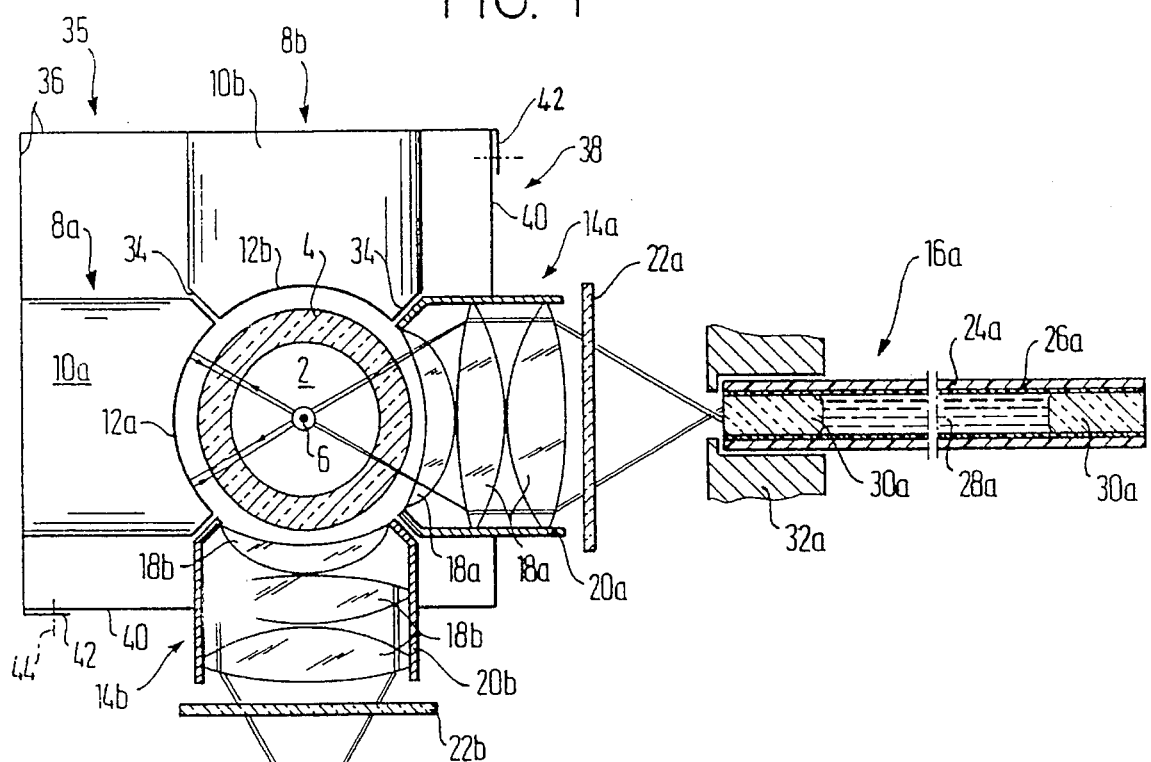
FIG. 1 is a plan view, partially in section, of a preferred embodiment of the present invention showing a light source having two light pipes.

Referring to the drawings, and more particularly to FIG. 1, a lamp 2 in the form of a mercury maximum-pressure lamp has an elongated bulb 4, which widens in the middle in a spherical manner. Lamp 2 has electrodes 6, which traverse the bulb in a lengthwise direction. Within the spherical widening, the electrodes terminate with a small electrode interval of roughly 2–3 mm, forming between them the path for an electric arc. In FIG. 1, only one end of the tope electrode 6 is shown. It should be appreciated that the second electrode 6 is located in a line directly below the top electrode, in a conventional manner, and has a top termination roughly 2–3 mm below the bottom end of the top electrode. As noted above, the opposing ends of electrodes 6 terminate within the spherical widening of the bulb 4 to form an electrode gap. Two reflectors 8a and 8b are arranged on the glass bulb 4 of the lamp 6. These reflectors are immediately adjacent the gap between electrodes 6. As can be seen in FIG. 1, reflectors 8a and 8b are arranged at right angles to each other. The carriers have a circular cross-section and are spherically hollowed out on their side facing the lamp, the spherical surface being mirror-faced. In order to obtain the desired reflection ratios, the plasma arc formed in the electrode gap must lie between the electrodes 6 in the center of curvature of the spherical mirror 12a, b. On the other hand, the concave mirrors 12a, b should have an aperture that is large enough to take advantage of the full aperture-angle condensers 14a and 14b (which are arranged respectively opposite the reflectors 8a, b. The aperture angle in turn is dimensioned in accordance with the aperture of light pipes 16a and 16b (2 alpha=72°, phi=5 mm arranged respectively opposite the condensers 14a and 14b so that the light-transfer capacity of the light pipes is fully utilized.

The condensers 14a, b are designed as three-lens types in order to achieve the large aperture angle (72°) of the liquid light pipes used in this embodiment. The lenses, which are designated by a common designating number 18a and 18b, are made of quartz glass for reasons of good UV transparency and are supported in a lens mounting 20a and 20b. Between each condenser 14a, b and the pertinent light pipe 16a, b, there is arranged on shutter 22a and 22b. By the use of these shutters, the irradiation of the light into the respective light pipe may be controlled on a time basis. The shutters 22a, b are preferably controlled electrically and are operated by magnets. The opening time can be adjusted in accordance with the respectively required exposure times. Preferably, the two shutters are capable of being adjusted and operated independently of each other. The electrical and/or electronic control circuits required for the purpose are known in prior art.

The light pipes 16a, b have a shell 24a and 24b made of a fluorocarbon material with a relatively low index of refraction. The shell is coated with a very thin internal layer 26a and 26b, made of an amorphous fluorinated synthetic material and an index of refraction that is even lower, The inner coating has the formula

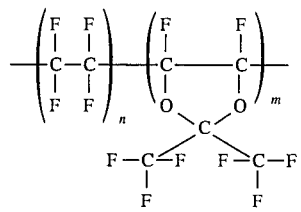

and is based on a combination of tetrafluorethylene and a fluorinated cyclic ether, which functions as a distancing component with respect to the polymer main chain. In this fashion, crystallization is sterically prevented. Each of light pipe is filled with a light-conducting liquid 28a and 28b, preferably based on an inorganic ionic aqueous solution such as $C_aCl_2+H_2O$, so that aperture angles of 72° are possible. Each light pipe is closed at both ends with a light-transparent plug 30a and 30b. The diameter of the light pipe may range between 3 mm and 8 mm but is preferably 5 mm for the illustrated embodiment. The end of the light pipe 16a, 16b on the lamp side sits in a plug-in socket 32a and or 32b (only shown here in schematic fashion), at a precisely measured distance from the respective condenser 14a, 14b. In this manner, the light coming from the condenser is optimally coupled into the input end of the light pipe.

Figure 2:
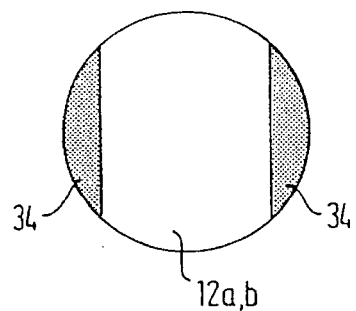
FIG. 2 is a top view of the mirror surface of one of the reflectors of the light source of FIG. 1.

In order to make it possible to accommodate a second optical system, in spite of the previous problems concerning distances and sizes of mirrors and condensers, the angle between the optical axes is made 90°. The abutting edges between adjacent mirrors and condensers, as well as between mirror and condensers surfaces among each other, are beveled at right angles to the plane of the two optical axes. In this fashion, the mirrors and condensers can be moved closer towards the plasma center of the lamp. These bevelings are carried out only in one dimension of the circularly limited front surfaces of the mirrors and condenser mounts and are shown in FIG. 2 by the dotted segments 34. In the case of the reflectors, the supports 10a, 10b are ground angularly on the sides, as can be seen in FIG. 1. In that case, two lateral segments of the mirror surface are lost, but the mirror is maintained in its original height, as shown in FIG. 2. However, this loss in mirror surface is relatively small and for both light pipes amounts to a total reduction in light output of at most 5%. Compared to a circular reflector with a diameter of the distance between the two segments 34, the fact that the full mirror diameter is maintained in the region other than that of segments 34 yields a significant gain in light utilization.

In the case of the condensers 14a, 14b, it is sufficient if their mounts 20a, 20b are angularly beveled, without affecting the front lens itself. The diameter of the front lens 18a, 18b continues as before to be fully in accordance with the optical requirements of the light-pipe aperture. In any event, sufficient mount material remains available for the support of the front lens, so as to ensure a support that will meet all mounting requirements.

In FIG. 1, there is furthermore indicated a module 35 containing the lamp 2 and the two reflectors 8a, 8b. The module contains two walls 36 of the lamp housing 38 enveloping the lamp. The two other walls 40 of the housing carry the condensers 14a, 14b and are rigidly mounted in the device housing, while the module 35 with lamp and reflectors is replaceable. In order to fasten the module, there are provided two fastening screws 44, which can be inserted through overlapping edges 42. The fastening screws which may take the form of knurled screws are only indicated schematically. In the module, the lamp 2 is adjustable in three coordinate directions, namely in the axial direction of the lamp as well as in two horizontal directions, so that is plasma arc may be aligned precisely with the optical center of the two optical systems, which cross each other at 90°. These adjustments are carried out at the factory so that the user has nothing else to adjust on the module, and must only insert and screw it in place in the device.

It is evident that with the illustrated embodiment, when the lamp 2 is energized, the resulting plasma arc, formed in the gap of electrodes 6, is provided in the center of curvature of the spherical mirrors 12a and 12b. With the above-described advantageous arrangement of the mirrors 12a and 12b, light resulting from the plasma arc is reflected towards the respective light pipes 16a and 16b via the condensers 14a and 14b. The intensity of the reflected light from each mirror is substantially equal to the intensity of light developed by the plasma arc.

Accordingly each of the light pipes 16a and 16b receives light substantially equal to the intensity of light developed by the pipes arc. The resulting light, available for irradiation purposes, is substantially double that of a light source having s single reflective surface and light pipe.

While the present invention has been described with respect to the illustrated embodiment, it is evident that changes can be made in the illustrated elements without departing from the scope and spirit of the present invention as defined by the appended claims.

I claim:

1. A lighting device comprising:

a first optical system with a first optical axis having a lamp arranged along said first optical axis, a first reflector arranged on a first side of said lamp along said first optical axis, a first condenser arranged on a second side of said lamp opposite said first side, along said first optical axis, to receive substantially all light reflected from said first reflectors, said condenser having a support for mounting a first light pipe along said first optical axis for transmission of substantially all of the light passing through said first condenser to said first light pipe;

a second optical system having a second optical axis substantial 90° shifted from said first optical axis of said first optical system, said second optical system having a second reflector and a second condenser arranged on opposite sides of said lamp along said second optical axis, said second condenser having a support for mounting a second light pipe along said second optical axis for transmission of substantially all of the light passing through said first condenser to said second light pipe.

2. A lighting device according to claim 1, wherein said lamp and said first and second reflectors are mounted in a replaceable module, said module being adapted to be mounted said device along said first and second optical axes.

3. A lighting device according to clam 2, wherein said module encompasses a part of a rectangular lamp housing said part being open on two adjacent side walls and wherein said first and second reflectors are mounted in an adjusted position on said adjacent side walls of said part.

4. A lighting device according to claim 1, wherein said reflectors are concave mirrors mounted on corresponding carriers and wherein each of said condensers includes lenses supported in mounts; said carriers and mounts are arranged at an angle of 90° with respect to each other and are chamfered at their mutually adjacent edges such that said edges of said lenses and said mirrors are substantially adjacent to each other for operating purposes.

5. A lighting device according to claim 4, wherein the chamfered edges of said carriers (10a, 10b) also encompass light-active marginal parts of said concave mirrors.

6. A lighting device according to claim 1, wherein said device is mounted in a lamp housing adapted to accept said first and second light pipes mounted at right angles to each other, said first and second light pipes being in the form of first and second plug-in sockets, respectively.

7. A lighting device according to claim 6, wherein said housing includes a first and second set of housing walls, said second set of walls having two adjacent walls each being adapted to accept one of said first and second plug-in sockets at an angle of 45°.

8. A lighting device according to claim 1, wherein each of said two optical systems includes a shutter and wherein said shutters are adapted to be operated independently of each other.

9. A lighting device according to claim 1, wherein said reflectors are spherical concave mirrors, metallized by vacuum deposition.

10. A lighting device according to claim 8, wherein said reflectors are dichroic mirrors, which are transparent to long-wave radiation.

11. A lighting device according to claim 1, wherein said condensers contain quartz lenses which are transparent to UV.

12. A lighting device according to claim 1, wherein said lamp is a mercury maximum-pressure lamp.

13. A lighting device according to claim 1, wherein said lamp is a xenon maximum-pressure lamp.

14. A lighting device according to claim 1, wherein a first light pipe is mounted in said support of said first condenser and a second light pipe is mounted in said support of said second condenser.

15. A lighting device according to claim 14, wherein said light pipes are liquid light-pipes, consisting of a liquid core in the form of an aqueous inorganic solution and a hose-shaped shell made of a substantially transparent fluorocarbon polymer.

16. A lighting device according to claim 15, wherein said shell is coated with a thin inner layer whose material has the formula

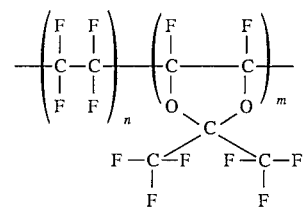

and is based on a combination of tetrafluorethylene and a fluorinated cyclic ether, which functions as a distancing component for the polymer main chain, by which the crystallization is sterically prevented.

17. A lighting device according to claim 15, wherein said inorganic solution of said core contains $C_aCl_2$ and $H_2O$.

18. A lighting device according to claim 15, wherein said inorganic solution of said core contains $K_2HPO_4$ and, $H_2O$.

* * * * *